United States Patent [19]
McKelvy

[11] Patent Number: 6,071,035
[45] Date of Patent: Jun. 6, 2000

[54] INTERCHANGEABLE TOOL COUPLING ASSEMBLY HAVING SPRING-BASED LOCKING SLEEVE

[75] Inventor: Marvin D. McKelvy, Centralia, Mo.

[73] Assignee: Hubbell Incorporated, Orange, Conn.

[21] Appl. No.: 09/087,877

[22] Filed: Jun. 1, 1998

[51] Int. Cl.[7] .................................................. B25G 3/16
[52] U.S. Cl. ...................................... 403/322.2; 403/320
[58] Field of Search .................... 294/19.1, 24; 81/53.1, 81/53.11, 53.12, 177.85; 285/92; 403/300, 302, 306, 322.1, 322.2, 328, 315, 320, 349, DIG. 4

[56] References Cited

U.S. PATENT DOCUMENTS

| | | | |
|---|---|---|---|
| 365,263 | 6/1887 | Leib | 403/315 X |
| 1,920,168 | 8/1933 | Bodendieck | 81/53.1 |
| 1,984,566 | 12/1934 | Bodendieck | 81/53.1 |
| 3,004,362 | 10/1961 | Day | 294/19.1 X |
| 4,661,009 | 4/1987 | Tripp | 403/349 |
| 4,663,796 | 5/1987 | Helling et al. | 403/315 X |
| 5,851,035 | 12/1998 | Marc et al. | 285/92 X |

*Primary Examiner*—Lynne H. Browne
*Assistant Examiner*—Greg Binda
*Attorney, Agent, or Firm*—Jerry M. Presson; Michael R. Swartz

[57] ABSTRACT

An interchangeable tool coupling assembly includes a coupling base, a connecting collar, a locking sleeve, a wave spring and an interchangeable tool having a shaft with an end and a pin protruding from a side of the shaft end. At one end portion, the coupling base receives the shaft end and at an opposite end portion is threadable into a threaded hex shaped endof an universal handle. Between its opposite end portions, the coupling base has a hex shaped nut. The connecting collar is disposed over the coupling base and slidable relative thereto toward and away from the hex shaped nut in which a hex shaped hollow end portion of the connecting collar assumes respective connected and disconnected positions relative to the hex shaped end of the universal handle threaded with the hex shaped nut, respectively preventing and allowing unthreading of the handle end from the coupling base. The locking sleeve is disposed over the one end portion of the coupling base and defines L shaped slots each having locking and unlocking portions and receiving opposite ends of the interchangeable tool pin. When the connecting collar is in its connected position, the locking sleeve is rotatable relative to the coupling base between locked and unlocked conditions in which opposite ends of the pin are correspondingly disposed in the locking and unlocking portions of the slots. The wave spring biases the locking sleeve to retain the opposite ends of the pin in the locking portions of the slots thereby retaining the locking sleeve in its locked condition and the connecting collar in its connected position.

15 Claims, 2 Drawing Sheets

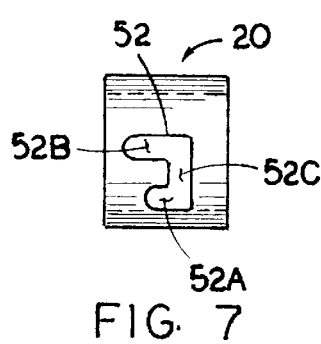
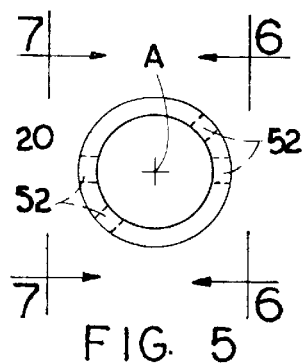
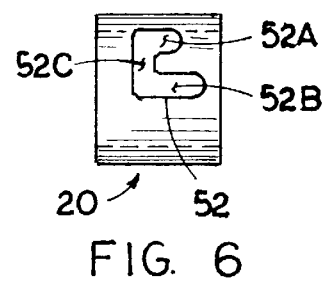
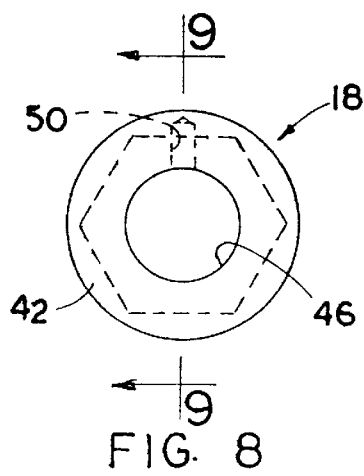
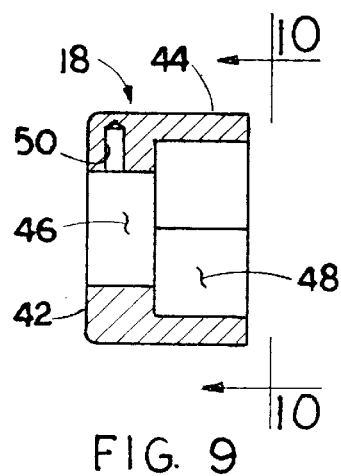
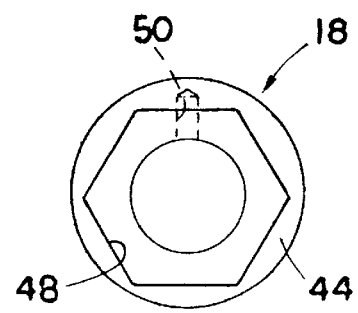
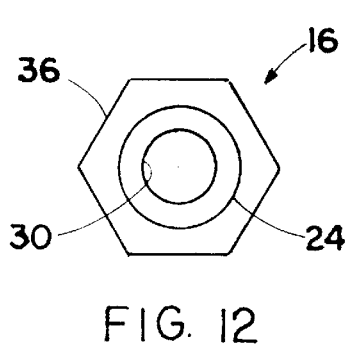
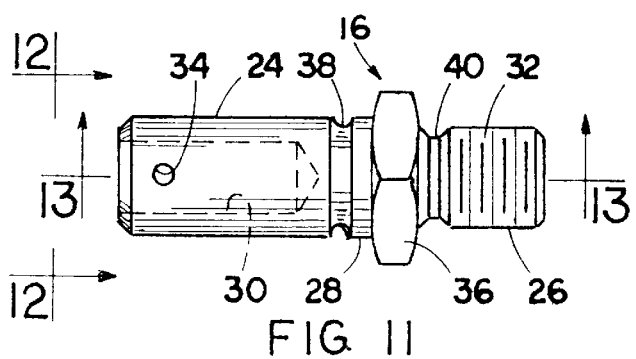
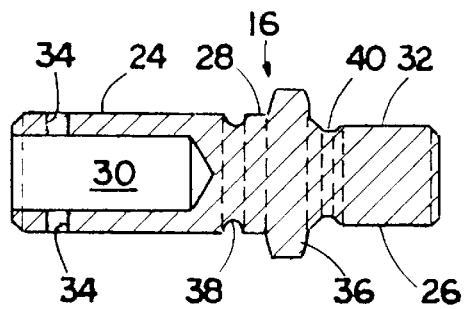

INTERCHANGEABLE TOOL COUPLING ASSEMBLY HAVING SPRING-BASED LOCKING SLEEVE

BACKGROUND OF THE INVENTION

1. Field of the Invention

The present invention generally relates to devices for coupling interchangeable tools to universal handles and, more particularly, is concerned with an interchangeable tool coupling assembly having a spring-biased locking sleeve.

2. Description of the Prior Art

In the electrical utility industry, considerable work is done by use of elongated insulated tools or "hot sticks." To minimize the number of such sticks required to be carried by line crew members, universal handles and interchangeable tools have been developed.

There are two basic types of coupling means used between the universal handles and interchangeable tools. A first basic type is a disc-shaped coupler having protruding teeth mateable with similar teeth on the interchangeable tools. A bolt or screw in the center of the disc-shaped coupler holds a tool and handle together while the teeth hold the parts in alignment.

A second basic type is a hex-shaped coupler having a ferrule member on the end of the handle which has a hex shape with a female threaded center hole, much like a hex nut. The interchangeable tools have a male threaded member with a hex shape which matches the hex shape of the ferrule member. To install the tool, a line crew member screws the male threaded member into the female threaded center hole of the hex shaped ferrule member until it is nearly tight, making sure the flats of the two hex shaped members are in alignment. A collar, which has an internal female hex shape, is then slid down over the male hex shaped member and female hex shaped ferrule member to a locking position, preventing the tool from unscrewing from the handle.

To retain the collar in the locking position, for many years a spring-loaded ball has been provided in the collar which becomes engaged in a groove provided on the male member when the collar reaches the locking position. However, this proved unsatisfactory as the collar could be unlocked by a cross arm or the like accidentally hitting the collar. One approach to preventing the accidental unlocking was to install a cotter pin in a through hole behind the collar after it was in the locking position. This approach worked positively, but required a supply of cotter pins as they became bent and unusable. Another approach, one still in use today, is a molded plastic "C" clip with a protruding pin. The clip is slipped over the tool behind the collar and the protruding pin inserts into the same through hole as was used by the cotter pin. This is an improvement in that the clip is reusable many times over and does not require replacement because of deformation.

In practice, however, the clips are difficult to use by line crew members wearing their standard gloves and therefore either become lost or not used. In addition, the protruding pin being made of plastic can be sheared off by a force imposed on the collar from hitting a cross arm or the like.

Consequently, a need remains for an approach which will provide an effective and comprehensive solution for the aforementioned problems associated with the prior art devices used for the coupling of universal handles and interchangeable tools and without introducing any new problems in place thereof.

SUMMARY OF THE INVENTION

The present invention provides an interchangeable tool coupling assembly which is designed to satisfy the aforementioned need. The interchangeable tool coupling assembly of the present invention provides an effective means for releasably coupling universal handles and interchangeable tools. The interchangeable tool coupling assembly employs a locking sleeve defining an L-shaped slot for receiving a pin on the tool. The coupling assembly also employs a spring, such as a wave spring, which biases the locking sleeve to retain the pin on the tool protruding in a locking portion of the slot of the sleeve and thereby secure and retain the universal handle and the interchangeable tool intercoupled to one another.

Accordingly, the present invention is directed to an interchangeable tool coupling assembly for releasably intercoupling an end of an universal handle with an interchangeable tool. The coupling assembly comprises: (a) a shaft of the interchangeable tool having an end and a pin protruding from a side of said shaft end; (b) a coupling base including one end portion receiving the shaft end and having a side opening with the pin protruding therethrough and therefrom, the coupling base also including an opposite end portion rotatably connectable with the universal handle end; (b) a connecting collar disposed over the coupling base and movable relative thereto toward and away from the opposite end portion thereof and having a hollow end portion for assuming connected and disconnected positions relative to the universal handle end rotatably connected with the opposite end portion of the coupling base in which the connecting collar correspondingly prevents and allows rotatable disconnection of the universal handle end from the coupling base; (c) a locking sleeve disposed over the one end portion of the coupling base adjacent to the connecting collar and movable relative to the coupling base and toward and away from the connecting collar between locked and unlocked conditions relative thereto, the locking sleeve defining a slot receiving the pin and having locking and unlocking portions such that when the connecting collar is in the connected position and the locking sleeve is moved to the locked condition the pin becomes disposed in the locking portion of the slot preventing the connecting collar from moving from the connected position whereas when the locking sleeve is moved to the unlocked condition the pin becomes disposed in the unlocking portion of the slot permitting the connecting collar to move to the disconnected position; and (d) a spring member biasing the locking sleeve to releasably retain the pin in the locking portion of the slot of the locking sleeve and thereby secure the locking sleeve in the locked condition and retain the connecting collar in the connected position so as to correspondingly prevent the rotatable disconnection of the universal handle end from the coupling base.

More particularly, the spring member is an annular shaped wave spring washer disposed over the one end portion of the coupling base between the locking sleeve and connecting collar biasing the locking sleeve to move away from the connecting collar. Further, the unlocking and locking portions of the slot extend generally parallel with the direction of movement of the locking sleeve relative to the coupling base toward and away from the connecting collar. The unlocking portion of the slot has a greater length than the locking portion thereof. Also, the slot has a transverse portion extending between and interconnecting the locking and unlocking portions along which the pin is allowed to move between the locking and unlocking portions of the slot.

Still further, the shaft end of the interchangeable tool has a pair of opposite sides and the pin has opposite end portions extending outwardly in opposite directions from the opposite side of the shaft end. The coupling base has a pair of side openings in opposite segments of the one end portion thereof with opposite end portions of the pin extending through the side openings such that the opposite ends of the pin extend beyond the opposite segments of the one end portion of the coupling base. The locking sleeve further defines a pair of opposite slots receiving the opposite ends of the pin, each of the slots having the locking and unlocking portions. The locking sleeve is rotatable between the locked and unlocked conditions relative to the coupling base when the connecting collar in the connected position such that when the locking sleeve is moved to the locked condition the opposite ends of the pin become disposed in the locking portions of the slots preventing the connecting collar from moving from the connected position whereas when the locking sleeve is moved to the unlocked condition the opposite ends of the pin become disposed in the unlocking portions of the slots permitting the connecting collar to move to the disconnected position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 5 is a tool end elevational view of the locking sleeve of the coupling assembly.

FIG. 6 is a side elevational view of the locking sleeve as seen along line 6—6 of FIG. 5.

FIG. 7 is an opposite side elevational view of the locking sleeve as seen along line 7—7 of FIG. 5.

FIG. 8 is a tool end elevational view of a connecting collar of the coupling assembly.

FIG. 9 is a longitudinal sectional view of the connecting collar taken along line 9—9 of FIG. 8.

FIG. 10 is a handle end elevational view of the connecting collar as seen along line 10—10 of FIG. 9.

FIG. 11 is a side elevational view of a coupling base of the coupling assembly.

FIG. 12 is a tool end elevational view of the coupling base as seen along line 12—12 of FIG. 11.

FIG. 13 is a longitudinal sectional view of the base unit taken along line 13—13 of FIG. 11.

DETAILED DESCRIPTION OF THE INVENTION

Figure 1:
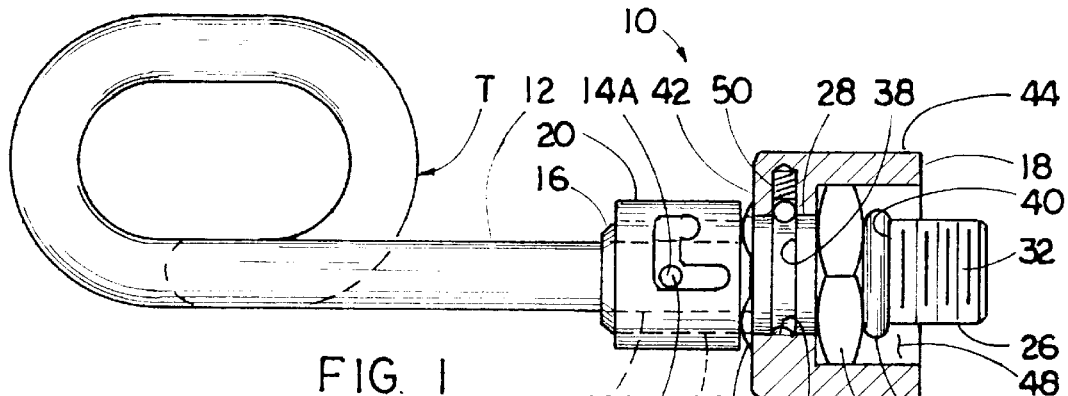
FIG. 1 is a side elevational view of an interchangeable tool coupling assembly of the present invention shown assembled on an end of a shaft of an interchangeable tool.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring to the drawings and particularly to FIGS. 1 to 4, there is illustrated an interchangeable tool coupling assembly of the present invention, generally designated 10, for releasably intercoupling an universal handle H with an interchangeable tool T. The universal handle H has a hex shaped ferrule F formed at an end thereof and an internally threaded opening I defined in the hex shaped ferrule F. The interchangeable tool T has a shaft 12 that supports any suitable tool, such as a spiral hook shown in FIG. 1.

Basically, the interchangeable tool coupling assembly 10 includes the shaft 12 of the interchangeable tool T having an end 12A and a pin 14 attached to the shaft end 12A having opposite ends 14A protruding in opposite directions from opposite sides of the shaft end 12A, a coupling base 16, a connecting collar 18, a locking sleeve 20, and a spring member 22. Only one of the opposite ends 14A of the pin 14 is shown in view that the other end would be identically disposed on the opposite side of the shaft end 12A. The shaft 12 and handle H are generally cylindrical in shape.

Referring to FIGS. 1–4 and 11–13, the coupling base 16 of the coupling assembly 10 has a cylindrical shape (though it may have any other suitable shape) and includes a pair of opposite end portions 24, 26 and a middle portion therebetween 28. A cylindrical bore 30 is defined in the left end portion 24 of the coupling base 16 receiving the end 12A of the shaft 12 of the interchangeable tool T and external threads 32 are formed on the right end portion 26 of the coupling base 16 for threadably inserting into the internal threaded opening I in the ferrule F on the end of the universal handle H. The left end portion 24 of the coupling base 16 has a diameter slightly greater than that of the externally threaded right end portion 26, though they may have any suitable size in relation to one another. Also, the left end portion 24 is longer than the threaded right end portion 26, though they may have any suitable lengths in relation to one another. The coupling base 16 along its left end portion 24 also has a pair of side openings 34 each aligned with the other across the bore 30 and receiving the pin 14 therethrough such that the opposite ends 14A of the pin protrude therefrom beyond opposite sides of the left end portion 24 of the coupling base 16. Additionally, a nut 36 of substantially hex shape being complementary or matched to that of the ferrule F on the end of the universal handle H is formed about the middle portion 28 of the coupling base 16.

The coupling base 16 further includes a first annular groove 38 defined about the middle portion 28 adjacent to one side of the nut 36 and to the left end portion 24 of the coupling base 16 and a second annular groove 40 defined about the middle portion 28 adjacent to an opposite side of the nut 36 and to the right end portion 26 of the coupling base 16. The second annular groove 40 is adapted to accept an O-ring 41 placed around the coupling base 16 to provide a means for preventing the handle end ferrule F and threaded right end portion 26 of the coupling base 16 from becoming too tightly screwed together. The first annular groove 38 is adapted to receive a ball bearing B, as will be described below. The coupling base 16 at the location of the second annular groove 40 has a diameter slightly less than a diameter thereof at the location of the first annular groove 38. The hex shaped nut 36 on the middle portion 28 of the coupling base 16 is thus disposed between the first and second grooves 38, 40.

Referring to FIGS. 1–4 and 8–10, the connecting collar 18 of the coupling assembly 10 is generally of cylindrical shape (though it may have any other suitable shape) and disposed over the coupling base 16. The collar 18 is axially slidably movable along the coupling base 16 toward and away from the nut 36 between respective connected and disconnected positions, as seen respectively in FIGS. 3 and 4. The collar 18 has opposite connecting and coupling end portions 42, 44. The connecting end portion 42 of the collar 18 has a central opening 46 through which is received the left end portion 24 of the coupling base 16. The coupling end portion 44 of the collar 18 has an interior chamber 48 communicating at one end with the central opening and open at the other end. The interior chamber 48 is of a hex shape complementary to that of the nut 36 and ferrule F for receiving the nut 36 and ferrule F therein when the threaded right end portion 26 of the coupling base 16 is threaded into the threaded opening I in the ferrule F so as to bring the respective flats of the nut 36 and ferrule F into adjacent alignment with one another. Thus, the connecting collar 18 is dimensioned such that its interior chamber 48 snugly fits the hex shaped nut 36 of the coupling base 16 and the hex shaped ferrule F of the universal handle H inside when the collar 18 is at its connected position of FIG. 4. With the collar 18 at its connected position of FIG. 4, the nut 36 and ferrule F are both held by the coupling end portion 44 of the collar 18 in a non-rotatable relationship with one another in which disconnection of the handle end from the couple base 16 is prevent. On the other hand, with the collar 18 at its disconnected position of FIGS. 2 and 3, the handle end is released from the coupling end portion 44 of the collar 18 into a rotatable relationship with the nut 36 of the coupling base 16 allowing disconnection of the handle end from the coupling base 16.

Figure 4:
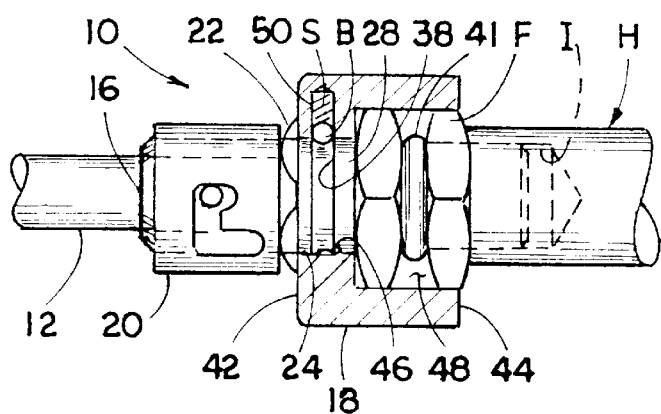
FIG. 4 is a side elevational view of the coupling assembly shown assembled on the shaft end and engaged with the universal handle end with the locking sleeve of the coupling assembly in the locked condition.

The connecting collar 18 also defines an offset passage 50 for receiving a coil spring S and the ball bearing B for engaging the first annular groove 38. The offset passage 50 is dimensioned so as to snugly fit the coil spring S and the ball bearing B therein with the ball bearing B disposed between the coil spring S and the coupling base 16 for engaging the first annular groove 38 when it becomes aligned therewith when the collar 18 is moved toward the nut 36 and into its connected position as seen in FIG. 4.

Referring now to FIGS. 1 to 7, the locking sleeve 20 of the coupling assembly 10 has a substantially annular configuration, though may have any other suitable shape. The locking sleeve 20 is hollow in configuration, has a longitudinal axis A, and is disposed over the left end portion 24 of the coupling base 16 adjacent to the connecting collar 18. The locking sleeves 20 defines a pair of opposite slots 52 receiving the opposite ends 14A of the pin 14 intersecting the left end portion 24 of the coupling base 16 and the shaft end 12A. Each slot 52 has spaced apart locking and unlocking portions 52A, 52B extending generally parallel to the longitudinal axis A of the locking sleeve 20 (and to the direction of movement of the locking sleeve 20) and a transverse portion 52C extending generally perpendicular to the longitudinal axis A of the locking sleeve 20 and interconnecting the locking and unlocking portions 52A, 52B. The unlocking portion 52B of the slot 52 has a greater length than the locking portion 52A thereof. Also, the transverse portion 52C of the slot 52 extending between and interconnecting the locking and unlocking portions 52A, 52B allows the pin ends 14A to be moved between the locking and unlocking portions 52A, 52B of the slot 52.

Further, the locking sleeve 20 is slidably moveable longitudially along the coupling base 16 and also is rotatable between locked and unlocked conditions relative to the coupling base 16. When the connecting collar 18 in its connected position of FIG. 4 and the locking sleeve 20 is moved from its unlocked to locked condition the opposite ends 14A of the pin 14 undergo movement relative to the locking sleeve 20 through the transverse portions 52C of the slots 52 to the locking portions 52A thereof preventing the collar 18 from moving from the connected position of FIG. 4. On the other hand, when the locking sleeve 20 is moved from its locked to unlocked condition the opposite ends 14A of the pin 14 undergo movement relative to the locking sleeve 20 through the transverse portions 52C of the slots 52 to the unlocking portions 52B thereof permitting the collar 18 to move to its disconnected position of FIGS. 2 and 3.

Finally, referring to FIGS. 1–4, the spring member 22, preferably but not necessarily, is an annular shaped wave spring washer. The wave spring washer 22 is disposed over the left end portion 24 of the coupling base 16 between the locking sleeve 20 and connecting collar 18, biasing the locking sleeve 20 to move away from the connecting collar 18.

Figure 2:
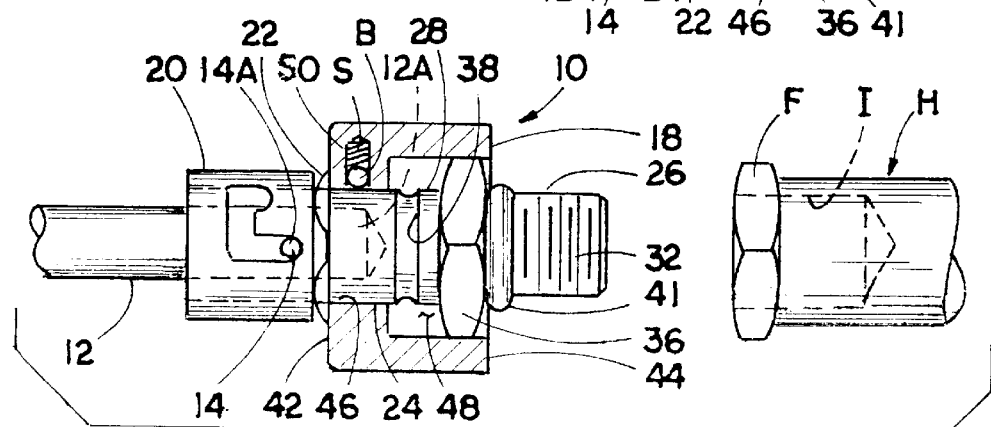
FIG. 2 is a side elevational view of the coupling assembly shown assembled on the shaft end and aligned for engagement with an end of an universal handle.
Figure 3:
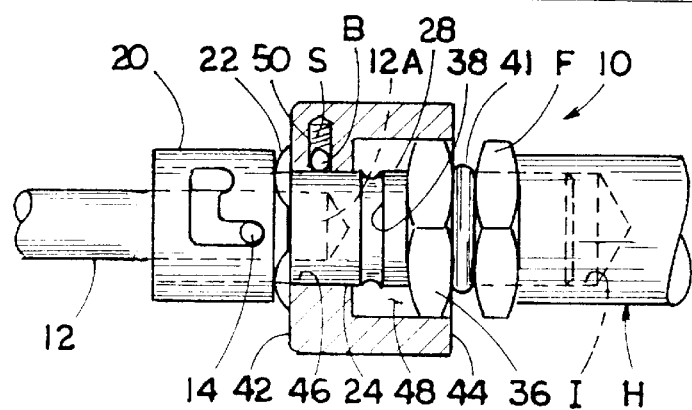
FIG. 3 is a side elevational view of the coupling assembly shown assembled on the shaft end and engaged with the universal handle end with a locking sleeve of the coupling assembly in an unlocked condition.

Three stages of assembling the interchangeable tool coupling assembly 10 are shown in FIGS. 2 to 4. In FIG. 2, the coupling assembly 10 is assembled on the shaft end 12A of the interchangeable tool T and aligned for (but before making) engagement with the end of the universal handle H. The ends 14A of the pin 14 are disposed in the unlocking portions 52B of the slots 52 of the locking sleeve 20. The hex-shaped interior chamber 48 of the collar 18 encloses only the hex-shaped nut 36 of the coupling base 16. The ball bearing B is disposed against a side of the middle portion 28 of the coupling base 16. The connecting collar 18, locking sleeve 20 and wave spring washer 22 have been shifted to the left on the left end portion 24 of the coupling base 16 and shaft end 12A of the interchangeable tool T. In FIG. 3, the coupling base 16 of the coupling assembly 10 has been brought into threaded connection with the end ferrule F of the universal handle H and the locking sleeve 20 is still in its unlocked condition.

In FIG. 4, the coupling assembly 10 is now engaged with the universal handle H and the locking sleeve 20 is in its locked condition relative to both the nut 36 and ferrule F. The first groove 38 of the coupling base 16 now accepts and seats the ball bearing B. The connecting collar 18, locking sleeve 20 and wave spring washer 22 have been shifted to the right on the shaft end 12A of the tool T and the left end portion 24 of the coupling base 16. The locking sleeve 20 has been rotated counterclockwise so as to transfer the pin ends 14A from the unlocking portions 52B to the locking portions 52A of the slots 52. The wave spring washer 22 biases the locking sleeve 20 away from the connecting collar 18 so as to retain the pin ends 14A in the locking portions 52A of the slots 52, the locking sleeve 20 in its locked condition, and the connecting collar 18 in its connected position so as to correspondingly prevent the rotatable disconnection of the universal handle end from the coupling base 16.

By forcing the locking sleeve 20 towards the wave spring washer 22 causing compression thereof, the locking sleeve 20 can be rotated clockwise to place the pin ends 14A in the unlocking portions 52C of the slots 52, allowing the locking sleeve 20 and connecting collar 18 to be shifted to the left away from the nut 36 to the disconnected position in which the handle end can then be rotatable disconnected from the coupling assembly 10.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

What is claimed is:

1. An interchangeable tool coupling assembly for releasably intercoupling an end of an universal handle with an interchangeable tool, said coupling assembly comprising:

(a) a shaft of the interchangeable tool having an end and a pin protruding from a side of said shaft end;

(b) a coupling base including one end portion receiving said shaft end and having a side opening with said pin protruding therethrough and therefrom, said coupling base also including an opposite end portion rotatably connectable with the universal handle end;

(c) a connecting collar disposed over said coupling base and movable relative thereto toward and away from said opposite end portion thereof and having a hollow end portion for assuming connected and disconnected positions relative to the universal handle end rotatably connected with said opposite end portion of said coupling base in which said connecting collar correspondingly prevents and allows rotatable disconnection of the universal handle end from said coupling base;

(d) a locking sleeve disposed over said one end portion of said coupling base adjacent to said connecting collar and movable relative to said coupling base and toward and away from said connecting collar between locked and unlocked conditions relative thereto, said locking sleeve defining a slot receiving said pin and having locking and unlocking portions such that when said connecting collar is in said connected position and said locking sleeve is moved to said locked condition said pin becomes disposed in said locking portion of said slot preventing said connecting collar from moving from said connected position whereas when said locking sleeve is moved to said unlocked condition said pin becomes disposed in said unlocking portion of said slot permitting said connecting collar to move to said disconnected position; and (e) a spring member biasing said locking sleeve to releasably retain said pin in said locking portion of said slot of said locking sleeve and thereby secure said locking sleeve in said locked condition and retain said connecting collar in said connected position so as to correspondingly prevent the rotatable disconnection of the universal handle end from said coupling base.

2. The coupling assembly as recited in claim 1, wherein said spring member is disposed over said one end portion of said coupling base between said locking sleeve and connecting collar biasing said locking sleeve to move away from said connecting collar.

3. The coupling assembly as recited in claim 1, wherein said spring member is an annular-shaped wave spring washer.

4. The coupling assembly as recited in claim 1, wherein said unlocking and locking portions of said slot extend generally parallel with the direction of movement of said locking sleeve relative to said coupling base toward and away from said connecting collar.

5. The coupling assembly as recited in claim 4, wherein said unlocking portion of said slot has a greater length than said locking portion thereof.

6. The coupling assembly as recited in claim 4, wherein said slot has a transverse portion extending between and interconnecting said locking and unlocking portions along which said pin is allowed to move between said locking and unlocking portions of said slot.

7. The coupling assembly as recited in claim 1, wherein said shaft end has a pair of opposite sides and said pin has opposite end portions extending outwardly in opposite directions from said opposite side of said shaft end.

8. The coupling assembly as recited in claim 7, wherein said coupling base has a pair of side openings in opposite segments of said one end portion thereof with opposite end portions of said pin extending through said side openings such that opposite ends of said pin extend beyond said opposite segments of said one end portion of said coupling base.

9. The coupling assembly as recited in claim 8, wherein said locking sleeve defines a pair of opposite slots receiving said opposite ends of said pin, each of said slots having said locking and unlocking portions, said locking sleeve being rotatable between said locked and unlocked conditions relative to said coupling base when said connecting collar in said connected position such that when said locking sleeve is moved to said locked condition said opposite ends of said pin become disposed in said locking portions of said slots preventing said connecting collar from moving from said connected position whereas when said locking sleeve is moved to said unlocked condition said opposite ends of said pin become disposed in said unlocking portions of said slots permitting said connecting collar to move to said disconnected position.

10. An interchangeable tool coupling assembly for releasably intercoupling an end of an universal handle with an interchangeable tool, said coupling assembly comprising:

(a) a shaft of the interchangeable tool having an end with opposite side portions and a pin attached to said shaft end and having opposite end portions extending outwardly in opposite directions from said opposite side portions of said shaft end;

(b) a coupling base including
      (i) a pair of opposite end portions and a middle portion therebetween,
      (ii) a bore defined in a first of said opposite end portions of said coupling base receiving said shaft end,
      (iii) a pair of side openings each aligned with the other and defined in opposite sides of said first end portion, said side openings receiving said opposite end portions of said pin therethrough such that said opposite ends of said pin extend therefrom beyond said opposite sides of said first end portion,
      (iv) external threads formed on a second of said opposite end portions of said coupling base for threadably inserting into internal threads in the end of the universal handle having a polgonal shape, and
      (v) a nut having a polygonal shape complementary to that of the universal handle end and formed about said middle portion of said coupling base;

(c) a connecting collar disposed over said coupling base and adjacent to said nut formed about said middle portion thereof and axially slidably movable along said coupling base toward and away from said nut between respective connected and disconnected positions, said connecting collar having opposite connecting and coupling end portions, said connecting end portion having a central opening through which is received said first end portion of said coupling base, said coupling end portion having a interior chamber of a shape complementary to and for receiving said coupling base middle portion nut and the universal handle end such that with said connecting collar at said connected position said nut and handle end are aligned adjacent to one another and both are held by said coupling end portion of said connecting collar in a non-rotatable relationship with one another in which disconnection of the handle end from said coupling base is prevented whereas with said connecting collar at said disconnected position at least the handle end is released from said coupling end portion of said connecting collar into a rotatable relationship with said nut of said coupling base in which disconnection of the handle end from said coupling base is allowed;

(d) a locking sleeve disposed over said first end portion of said coupling base adjacent to said connecting collar, said locking sleeve defining a pair of opposite slots receiving said opposite ends of said pin, each of said slots having locking and unlocking portions, said locking sleeve being rotatable between locked and unlocked conditions relative to said coupling base when said connecting collar in said connected position such that when said locking sleeve is moved to said locked condition said opposite ends of said pin become disposed in said locking portions of said slots preventing said connecting collar from moving from said connected position whereas when said locking sleeve is moved to said unlocked condition said opposite ends of said pin become disposed in said unlocking portions of said slots permitting said connecting collar to move to said disconnected position; and (e) a spring member biasing said locking sleeve to releasably retain said pin in said locking portions of said slots of said locking sleeve and thereby secure said locking sleeve in said locked condition and retain said connecting collar in said connected position so as to correspondingly prevent the rotatable disconnection of the universal handle end from said coupling base.

11. The coupling assembly as recited in claim 10, wherein said spring member is disposed over said first end portion of said coupling base between said locking sleeve and connecting collar biasing said locking sleeve to move away from said connecting collar.

12. The coupling assembly as recited in claim 10, wherein said spring member is an annular-shaped wave spring washer.

13. The coupling assembly as recited in claim 10, wherein said unlocking and locking portions of said slot extend generally parallel with the direction of movement of said locking sleeve relative to said coupling base toward and away from said connecting collar.

14. The coupling assembly as recited in claim 13, wherein said unlocking portion of said slot has a greater length than said locking portion thereof.

15. The coupling assembly as recited in claim 13, wherein said slot has a transverse portion extending between and interconnecting said locking and unlocking portions along which said pin is allowed to move between said locking and unlocking portions of said slot.

* * * * *